United States Patent Office 2,694,698
Patented Nov. 16, 1954

2,694,698

INTERPOLYMERIZATION OF MALEIC ANHYDRIDE AND VINYL ISOBUTYL ETHER

Frederick Grosser, North Plainfield, N. J., assignor to General Aniline & Film Corporation, New York, N. Y., a corporation of Delaware No Drawing. Application December 29, 1951, Serial No. 264,261

7 Claims. (Cl. 260—78.5)

This invention relates to a method of producing copolymers of maleic anhydride and vinyl isobutyl ether and more particularly to the production of such copolymers of relatively high molecular weight and high relative viscosity.

Maleic anhydride and vinyl isobutyl ether in a suitable solvent such as acetone or the like may be made to interpolymerize in well-known manner by means of an organic peroxide catalyst and heat. The polymer, after precipitation from solution, drying and pulverizing, is a white powder. For some applications, it is essential that the molecular weight of the polymer as indicated by its solution viscosity be as high as possible.

It is an object of this invention to produce in an efficient manner copolymers of maleic anhydride and vinyl isobutyl ether of relatively high molecular weight and high relative viscosity. Other objects and advantages will appear as the description proceeds.

These objects are attained by the instant invention which is based upon the discovery that the desired viscosity requirements can only be obtained when maleic anhydride is used which is essentially free of maleic acid. Specifically, the invention comprises polymerizing by heating an organic solvent solution containing vinyl isobutyl ether, maleic anhydride containing less than 0.3% by weight of free maleic acid and an organic peroxide catalyst. In this manner higher yields of a copolymer with the desired improved properties are obtained.

Since the maleic anhydride generally available contains a free maleic acid content above the stated maximum allowable amount, it is necessary to take steps to guard against the presence of such amounts of free maleic acid before the polymerization is carried out. It must be realized also that maleic anhydride is susceptible to hydrolysis upon standing for any length of time whereby an initially pure maleic anhydride would at the time of polymerization contain a free maleic acid content too high to produce the desired results. It is accordingly preferable to purify the maleic anhydride immediately prior to polymerization to sufficiently reduce its maleic acid content. This may be accomplished by anhydrous distillation of the maleic anhydride in the presence of phosphorous pentoxide. If any time is to elapse between the time of purification and the time of polymerization precautions must be taken to prevent hydrolysis by careful storage of the maleic anhydride under anhydrous conditions and the like.

The problem of polymerizing in the presence of less than 0.3% of free maleic acid by weight of the anhydride is accentuated when the polymerization is carried out in solvents which dissolve both maleic anhydride and maleic acid, such as acetone and the like as distinguished from benzene and the like in which the free acid is only slightly soluble and would accordingly have a decreased tendency to affect the reaction. Accordingly, the invention is particularly directed to polymerization in media of the former type.

The polymerization conditions with respect to temperature, duration and the like, are those which have been heretofore employed, the essential requirement being that the maleic anhydride contain less than 0.3% of free maleic acid by weight. The organic peroxides which may be employed as catalyst include benzoyl peroxide, lauroyl peroxide, ditertiary butyl peroxide and the like. The reactants are usually present in approximately equimolar amounts, although a slight excess of the vinyl isobutyl ether may be employed. After polymerization has proceeded for a period of time sufficient to produce a copolymer of the desired molecular weight and viscosity, the copolymer may if desired be partially or completely hydrolyzed by addition of water in order to modify its properties with respect to reactivity, solubility and other physical characteritics. In general, hydrolysis is carried out by heating the solution for from about one half to three hours, after all the water has been added, at temperatures of about 30° C. to the boiling point of the solution, depending on the degree of hydrolysis desired. Thus, the examples below illustrate the production of a copolymer in which the anhydride groups are hydrolyzed to an extent sufficient to impart to the product an enhanced solubility in alcohols, particularly lower alkyl alcohols such as methyl, ethyl and isopropyl alcohols, solubility in aqueous alkaline solutions, and substantial insolubility in water. This product is particularly useful as an antihalation layer on photographic film, in which application it may be coated on the film base from alcoholic solutions, readily washed with water, and subsequently stripped from the film in the alkaline developer.

As stated supra, the invention is particularly directed to copolymerization processes in which solvents such as acetone and the like are employed which dissolve both the maleic anhydride and maleic acid. Water-solubility is another important property of the solvents to be employed, particularly in the production of partially hydrolyzed copolymers wherein the homogeneity of the reaction mixture may be maintained during the subsequent addition of water for hydrolysis and the separation steps thereafter. Another desirable property of the solvent to be employed is a boiling point at about the desired polymerization temperature, which may range from about 30° to 85° C.

The following examples are illustrative of the invention and are not to be regarded as limitative:

*Example 1*

Into a three-liter, three-neck flask fitted with stirrer, reflux condenser and thermometer were charged:

147 g. (1.5 mol) maleic anhydride (0% free maleic acid)
167 g. (16.7 mol) vinyl isobutyl ether
800 g. acetone
1.8 g. lauroyl peroxide The mixture was gradually heated to 55° C., with agitation, and when polymerization started, as evidenced by vigorous refluxing the temperature was allowed to rise slowly to 60° C. Agitation and refluxing were maintained for five hours. Then, while agitation and refluxing were continued, 500 g. water were added at the rate of 85 g. per hour. Refluxing and agitation were maintained for an additional 1½ hours after all the water had been added. The solution was then cooled and dried on a drum dryer to obtain a white, flaky material comprising a partially hydrolyzed copolymer. The yield of polymer was 81% of theoretical, based on the maleic anhydride, and the relative viscosity of a 5% solution in ethanol was 18.8, as determined in an Ostwald-Fenske viscosimeter at 25° C.

*Example 2*

Example 1 was repeated, except that maleic anhydride containing 0.58% free maleic acid was used. The yield was 66% of theoretical, and the relative viscosity was 8.8.

*Example 3*

Into a two-liter, three-neck flask fitted with stirrer, reflux condenser and thermometer were charged:

98 g. (1 mol) maleic anhydride (0.26% free maleic acid)
111 g. (1.11 mol) vinyl isobutyl ether
535 g. acetone
1.0 g. lauroyl peroxide The mixture was heated, with agitation, to reflux in about 15 minutes, and agitation and refluxing maintained for 5 hours. Then 20 g. water were added in about 10 minutes and agitation and refluxing maintained for an additional hour. The polymer was precipitated by adding the resulting solution in a thin stream to about 15 gallons of rapidly agitated water. The white shredded partially hydrolyzed polymer was separated out and dried in vacuo at 50–60° C. for 16 hours. The yield of polymer was quantitative, and the relative viscosity was 12.7.

*Example 4*

This experiment was a duplicate of Example 3, except that maleic anhydride containing 0.86% free maleic acid was used. The yield of polymer was 92.5% and the relative viscosity was 5.1.

Various modifications and variations of this invention will be obvious to workers skilled in the art and it is understood that such modifications and variations are to be included within the purview of this application and the spirit and scope of the appended claims.

I claim:

1. A method comprising purifying maleic anhydride to reduce the free maleic acid content to less than 0.3% by weight of the anhydride, maintaining said free maleic acid content at less than 0.3% and then copolymerizing the purified maleic anhydride with vinyl isobutyl ether by heating in an organic solvent solution containing an organic peroxide catalyst.

2. A method as defined in claim 1 wherein said purifying step is accomplished by anhydrous distillation of the maleic anhydride in the presence of phosphorus pentoxide.

3. The product of the process of claim 1.

4. A method comprising purifying maleic anhydride to reduce the free maleic acid content to less than 0.3% by weight of the anhydride, maintaining said free maleic acid content at less than 0.3% and then copolymerizing the purified maleic anhydride with vinyl isobutyl ether by dissolving the maleic anhydride, vinyl isobutyl ether and an organic peroxide catalyst in acetone and heating the solution.

5. A method as defined in claim 4 wherein said purifying step is accomplished by anhydrous distillation of the maleic anhydride in the presence of phosphorus pentoxide.

6. A method comprising purifying maleic anhydride to reduce the free maleic acid content to less than 0.3% by weight of the anhydride, maintaining said free maleic acid content at less than 0.3% and then copolymerizing the purified maleic anhydride with vinyl isobutyl ether by dissolving the maleic anhydride, vinyl isobutyl ether and lauroyl peroxide in acetone and heating the solution.

7. A method as defined in claim 6 wherein said purifying step is accomplished by anhydrous distillation of the maleic anhydride in the presence of phosphorus pentoxide.

References Cited in the file of this patent

UNITED STATES PATENTS

| Number | Name | Date |
|---|---|---|
| 2,066,105 | Hagedorn et al. | Dec. 29, 1936 |